United States Patent
Huang et al.

(10) Patent No.: US 9,017,587 B2
(45) Date of Patent: Apr. 28, 2015

(54) MANUFACTURING METHOD OF BIODEGRADABLE NET-SHAPED ARTICLES

(71) Applicant: Minima Technology Co., Ltd., Taichung (TW)

(72) Inventors: Yu-Kai Huang, Taichung (TW); Chien-Ming Huang, Taichung (TW)

(73) Assignee: Minima Technology Co., Ltd., Taichung (TW)

( * ) Notice: Subject to any disclaimer, the term of this patent is extended or adjusted under 35 U.S.C. 154(b) by 325 days.

(21) Appl. No.: 13/757,404

(22) Filed: Feb. 1, 2013

(65) Prior Publication Data

US 2013/0147087 A1   Jun. 13, 2013

Related U.S. Application Data

(63) Continuation-in-part of application No. 12/840,701, filed on Jul. 21, 2010, now abandoned.

(51) Int. Cl.

| | |
|---|---|
| B29B 9/06 | (2006.01) |
| B29C 47/38 | (2006.01) |
| B29C 47/40 | (2006.01) |
| B29C 47/60 | (2006.01) |
| D01D 5/18 | (2006.01) |
| B29C 47/00 | (2006.01) |
| B29C 47/12 | (2006.01) |
| D04H 3/045 | (2012.01) |
| B29B 13/06 | (2006.01) |
| A46D 1/00 | (2006.01) |
| B65D 65/46 | (2006.01) |
| B65D 30/06 | (2006.01) |
| D01F 6/84 | (2006.01) |
| D01F 6/92 | (2006.01) |

(52) U.S. Cl.
CPC ........... *B29C 47/0026* (2013.01); *B29C 47/122* (2013.01); *D04H 3/045* (2013.01); *B29B 13/065* (2013.01); *A46D 1/00* (2013.01); *A46D 1/0215* (2013.01); *B65D 65/466* (2013.01); *B65D 29/04* (2013.01); *B29C 47/0014* (2013.01); *B29C 47/0021* (2013.01); *B29C 47/0028* (2013.01); *B29C 47/003* (2013.01); *B29C 47/0033* (2013.01); *D01F 6/84* (2013.01); *D01F 6/92* (2013.01)

(58) Field of Classification Search
CPC ........ B29B 9/06; B29B 13/06; B29B 13/065; B29C 47/0009; B29C 47/0014; B29C 47/0026; B29C 47/122; B29C 47/38; B29C 47/40; B29C 47/60; D01D 5/18; D02G 3/44; D04H 3/045
USPC ......... 264/141, 142, 143, 211, 211.1, 211.13, 264/211.14, 211.21, 211.22, 211.23, 237
See application file for complete search history.

(56) References Cited

U.S. PATENT DOCUMENTS 5,883,199 A * 3/1999 McCarthy et al. ............. 525/437

FOREIGN PATENT DOCUMENTS

JP 2004256946 A * 9/2004

* cited by examiner

*Primary Examiner* — Leo B Tentoni
(74) *Attorney, Agent, or Firm* — WPAT, P.C.; Anthony King

(57) ABSTRACT

A manufacturing method of biodegradable net-shaped articles includes: (a) preparing a biodegradable mixture; (b) granulating the mixture into plastic grains; (c) baking the plastic grains in an oven at 60° C. to 70° C. for 3 to 4 hours; (d) melting and extruding the plastic grains by a screw-type extruder so as to obtain a net-shaped preform; and (e) cooling and thereby finalizing the net-shaped preform in a cooling bath at 15° C. to 30° C. so as to obtain the net-shaped article.

10 Claims, 8 Drawing Sheets

| Property \ Example | A | B | C | D |
|---|---|---|---|---|
| Melting Point | 110°C | 110°C | 110°C | 110°C |
| Specific Gravity | 1.32 g/cm$^3$ | 1.30 g/cm$^3$ | 1.27 g/cm$^3$ | 1.26 g/cm$^3$ |
| Tensile Strength | 533 kgf/cm$^2$ | 539 kgf/cm$^2$ | 570 kgf/cm$^2$ | 588 kgf/cm$^2$ |
| Extension | 652 % | 509 % | 235 % | 220 % |
| Yield Strength | 161 kgf/cm$^2$ | 185 kgf/cm$^2$ | 280 kgf/cm$^2$ | 290 kgf/cm$^2$ |

FIG. 5

MANUFACTURING METHOD OF BIODEGRADABLE NET-SHAPED ARTICLES

This application is a continuation-in-part of U.S. application Ser. No. 12/840,701 entitled "Biodegradable Net-Shaped and Filament-Shaped Articles" filed on Jul. 21, 2010, now abandoned.

BACKGROUND OF THE INVENTION

1. Field the Invention

This invention relates to a manufacturing method of biodegradable net-shaped articles, wherein the produced net-shaped articles has acceptable structural strength and, after disposed, is capable of decomposing in the natural environment.

2. Description of the Related Art

A conventional net bag, which is one kind of net-shaped articles, is made of polymer materials capable of being easily processed and is formed by extruding and drawing the polymer materials to form a net sleeve, followed by heat sealing one end of the net sleeve to form the net bag with a closed end. The net bag has an open end, opposite to the closed end, for passage of goods, so that an accommodating space is formed between the closed end and the open end.

The net bag is mainly used for packaging the goods. Since the net bag is formed with pores for ventilation, it is perfect for packaging agricultural products, especially fruits or tubers, like yams for preventing the agricultural products from getting rotten.

Although the net bag is formed with the pores for keeping the goods in a ventilated state, the net bag still has the following drawbacks. Because the net bag is usually used for packaging the vegetables or the fruits, it is likely to be discarded after use. In order to form a net structure with a predetermined strength, the net bag is usually made of polyethylene (PE), polyethylene terephthalate (PET), or nylon. However, all of PE, PET and nylon are hard to decompose in natural environment and tend to cause environmental problems.

Therefore, an object of the present invention is to provide a method for making net-shaped articles that are biodegradable and that can provide desired structural strength.

SUMMARY OF THE INVENTION

In order to solve the foregoing problems, the present invention provides a manufacturing method of biodegradable net-shaped articles that has desired structural strength and biodegradability.

According to the present invention, the manufacturing method of biodegradable net-shaped articles comprising steps of:

(a) preparing a mixture having a melt flow index of between 3 and 8 by heating, stirring and thereby mixing a first material, a second material and a compatibilizer, with the first material being poly(butylenes adipate-co-terephthalate) (PBAT) that accounts for 20% to 80% of a total weight of the mixture, and the second material as well as the compatibilizer making up the mixture to 100% of its total weight, wherein the second material is a composition of polybutylene-1,4-succinate (PBS) and polylactic acid (PLA), in which PBS and PLA account for 70% to 100% and 0% to 30% of a total weight of the second material, respectively, and wherein the compatibilizer accounts for at least 0.05 wt % to 0.5 wt % of the mixture;

(b) granulating the mixture into plastic grains;

(c) baking the plastic grains in an oven at 60° C.~70° C. for 3 to 4 hours;

(d) melting and extruding the plastic grains by a screw-type extruder that has a rotary die unit so as to obtain a net-shaped preform, wherein in the extruder, a screw temperature is higher than a feed inlet temperature and a die temperature, while the die temperature is lower than the feed inlet temperature; and (e) cooling and thereby finalizing the net-shaped preform in a cooling bath at a cooling temperature between 15° C. and 30° C., so as to obtain the biodegradable net-shaped article.

The net-shaped article made according to the present invention contains PBS and is biodegradable, so when disposed can decompose in the natural environment. In other words, the products made using the manufacturing method of the present invention are advantageous as being practical and biodegradable. Since the biodegradable net-shaped article includes PBS having a relatively high heat deflection temperature, it is unlikely to deform and remains functional when used in under high heat or brought into contact with articles of high temperatures. Therefore, the present invention has the benefits of high heat tolerance and excellent durability.

BRIEF DESCRIPTION OF THE DRAWINGS

Other features and advantages of the present invention will become apparent in the following detailed description of the preferred embodiments of the invention, with reference to the accompanying drawings, in which:

FIG. 5 displays properties of net-shaped articles made in Examples A through D of the present invention as shown in FIG. 4;

DETAILED DESCRIPTION OF THE PREFERRED EMBODIMENT

Figure 1:
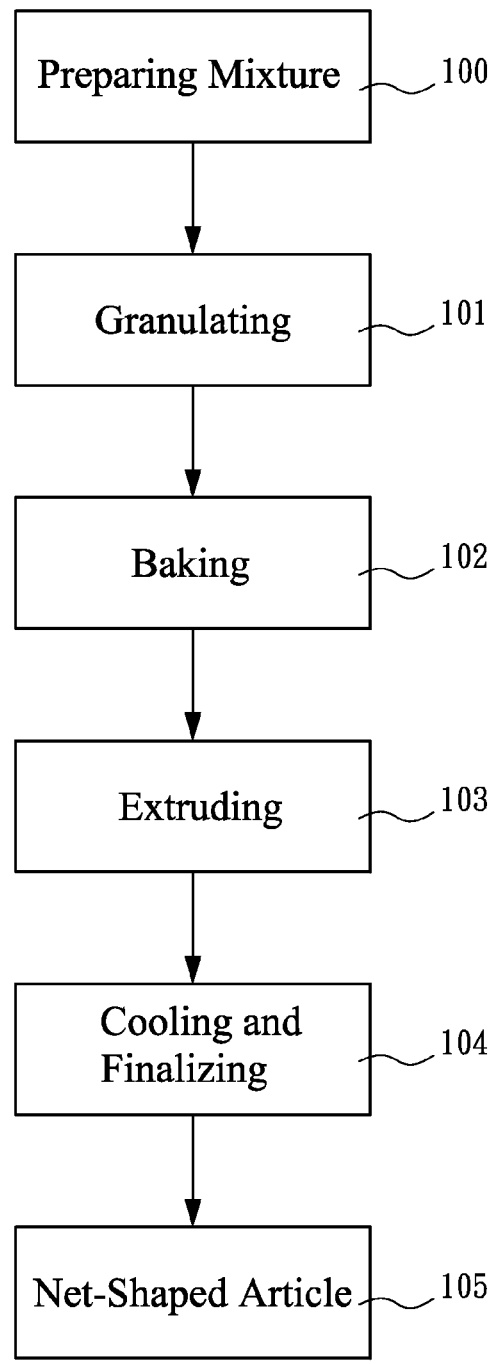
FIG. 1 and FIG. 2 are flowcharts of the manufacturing method of biodegradable net-shaped articles according to the present invention.
Figure 2:
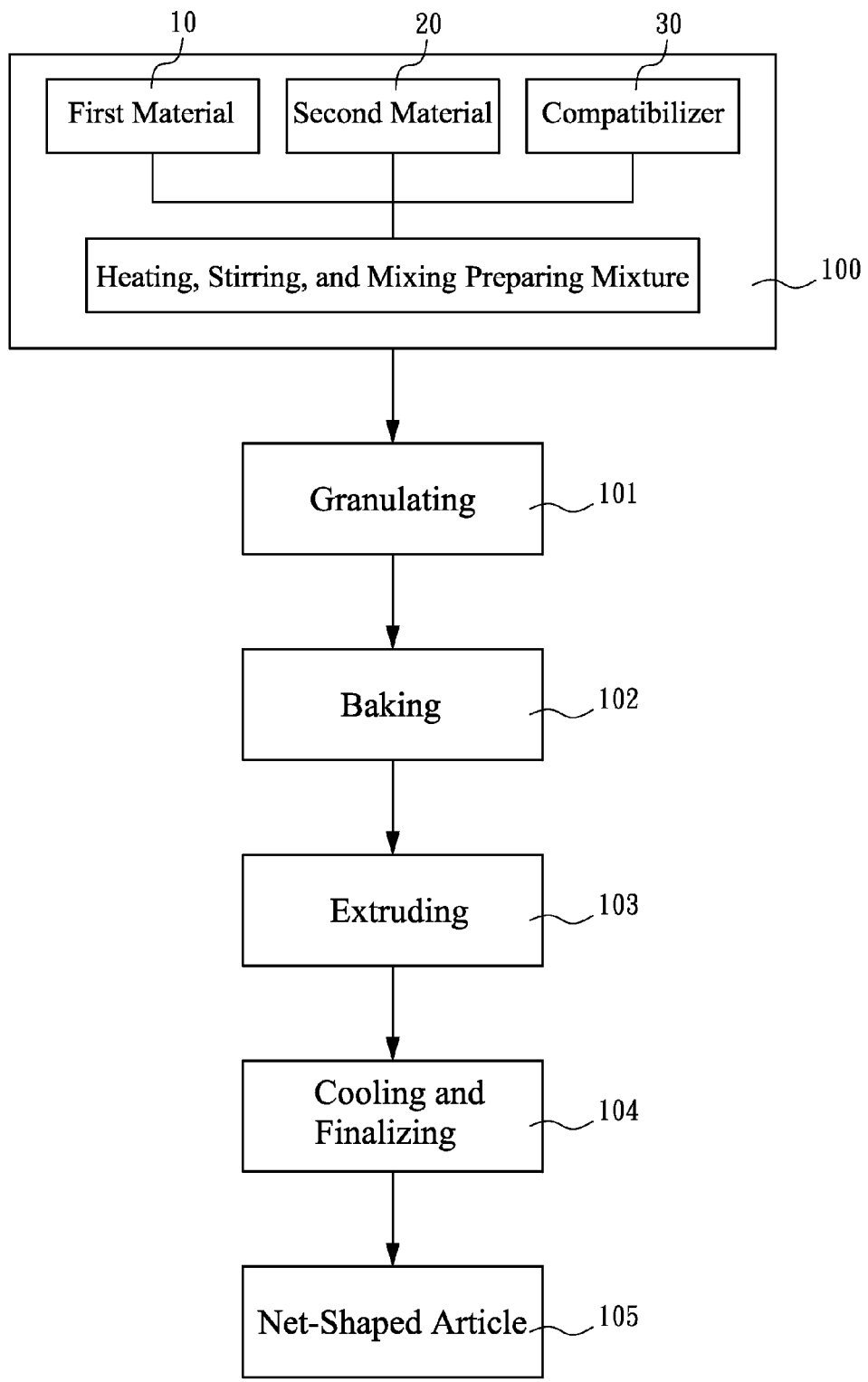
Figure 3:
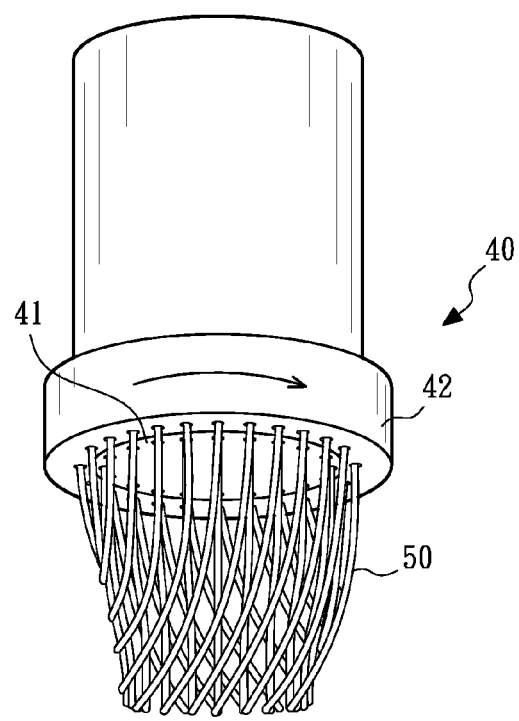
FIG. 3 is a schematic drawing showing an extruder extruding a net-shaped article preform according to the present invention.
Figure 3:
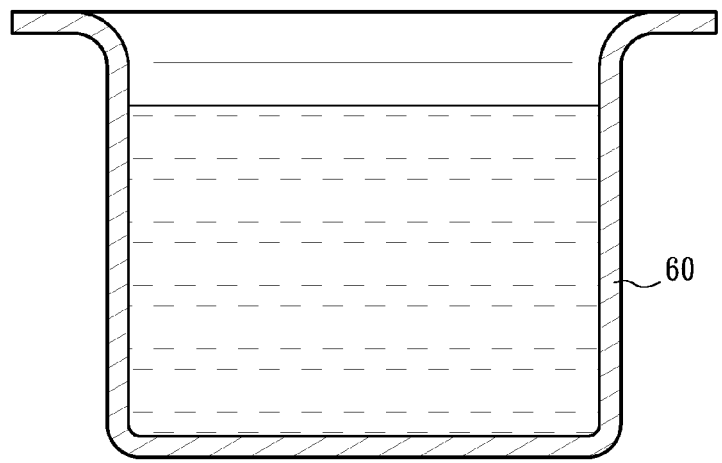

Referring to FIG. 1 and FIG. 2, according to the present invention, a manufacturing method of biodegradable net-shaped articles comprises the steps as described below.

(a) Preparing a Mixture 100:

In this step, by using a mixer, a first material 10, a second material 20 and a compatibilizer 30 are mixed into a mixture having a melt flow index of between 3 and 8. Therein, the first material 10 is poly(butylenes adipate-co-terephthalate) (PBAT) and that accounts for 20% to 80% of a total weight of the mixture, while the second material 20 is a composition of polybutylene-1,4-succinate (PBS) and polylactic acid (PLA). The compatibilizer 30 may be Hi Wax 2203a supplied by Mitsui Chemicals, Inc. (Japan), or Diacarna wax supplied by Mitsubishi Chemical Holdings Corp. (Japan). In particular, PBS accounts for 70~100 wt % of the second material 20, and PLA accounts for 0~30% wt % of the second material 20. The second material 20 and the compatibilizer 30 jointly make up the mixture to 100% of its total weight. For example, when the first material 10 accounts for 20 wt %, the second material 20 and the compatibilizer 30 jointly account for 80 wt % of the mixture. Alternatively, when the first material 10 accounts for 80 wt %, the combination of the second material 20 and the compatibilizer 30 accounts for 20 wt % of the mixture. Despite the ratio between the first material 10 and the second material 20, the compatibilizer 30 accounts for at least 0.05~0.5 wt % based on the total weight of the mixture.

It is to be noted that PBS are similar to acrylonitrile-butadiene-styrene (ABS) in terms of mechanical property and has a heat deflection temperature (HDT) up to 90° C., and PLA has high rigidity at normal temperature condition, while the compatibilizer 30 can enhance compatibility between the first material 20 and the second material 30. Thus, by adding PLA and the compatibilizer, the products of the present invention can have improved mechanical strength and dimensional stability at normal temperature condition.

(b) Granulating 101:

In this step, the mixture is granulated into plastic grains.

(c) Baking 102:

In this step, the plastic grains are baked in an oven at 60° C.~70° C. for 3 to 4 hours so as to remove water. This step can prevent hydrolysis caused by excessive water, thereby ensuring the strength of the resultant products.

(d) Extruding 103:

In this step, the plastic grains are fed into a screw-type extruder, which has a rotary die unit 40 that includes a telescoped trunk 41 and a rotating sleeve 42. Both of the trunk 41 and the rotating sleeve 42 have peripherally formed holes through which filaments of melted plastic grains are extruded. When the rotating sleeve 42 rotates about the telescoped trunk 41 during extrusion, the filaments output by the trunk 41 and the rotating sleeve 42, respectively, can get interlaced and stuck mutually to form a net-shaped preform 50. Therein, the extruder has a processing temperature between 115° C. and 180° C. Preferably, the screw-type extruder is a dual-screw extruder. The processing temperature has influence on hydrolysis of the resultant products. Particularly, an excessively high processing temperature can degrade the product quality. In view of this, for the extruder, the present invention sets its screw temperature that is higher than its feed inlet temperature and output die temperature, while the die temperature is lower than the feed inlet temperature, so that the extruder's processing temperature is first increased and then lowered. In a preferred embodiment, the maximum screw temperature is 30° C.~40° C. higher than the feed inlet temperature and is 40° C. higher than the die temperature.

(e) Cooling and Finalizing 104:

In this final step, the extruded net-shaped preform 50 vertically drops down to a cooling bath 60 at 15° C.~30° C. provided under the screw-type extruder, so that the net-shaped preform 50 is cooled and finalized into the desired net-shaped article 105.

The net-shaped article 105 made according to the present invention contains PBS that has good biodegradability and high heat tolerance. Thus, the net-shaped article 105 is unlikely to deform or break when used in high-temperature environment and is thus more durable and usable than the conventional products. When disposed, the net-shaped article 105 can decompose in the natural environment and thus is environmentally friendly.

Figure 4:
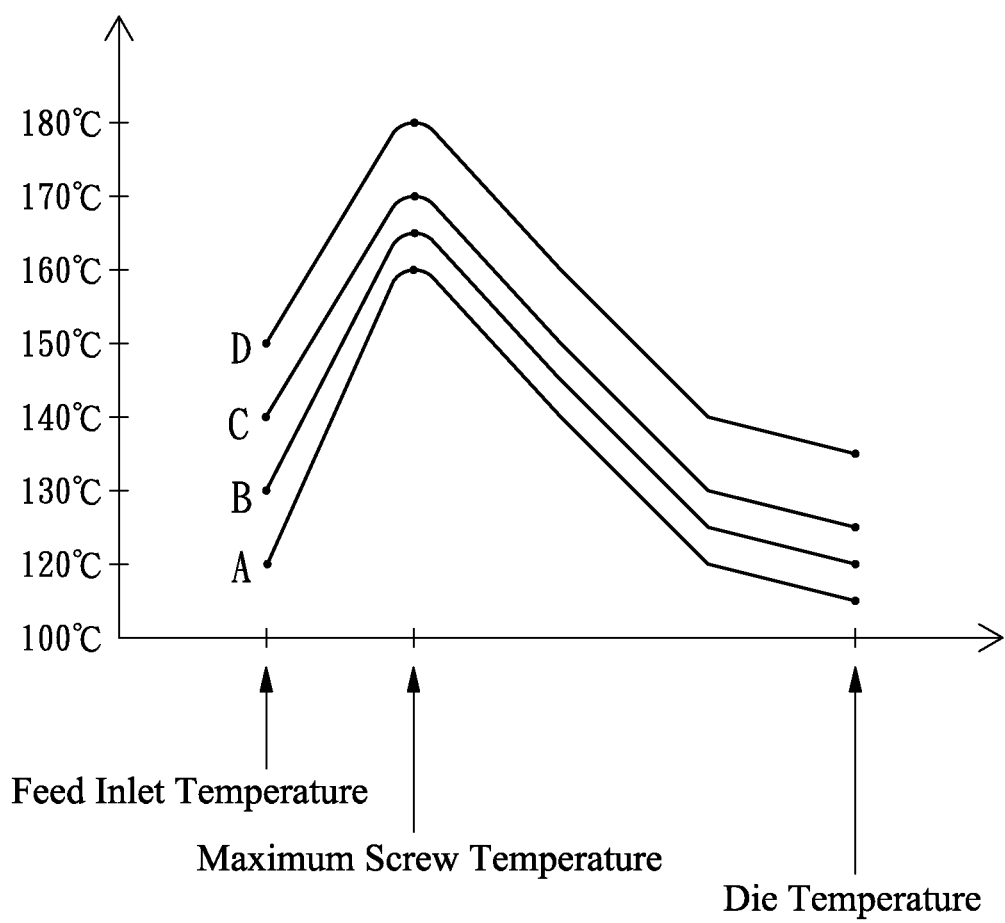
FIG. 4 graphically shows exemplary processing temperatures for an extruder performing the manufacturing method of the present invention.

FIG. 4 graphically shows exemplary processing temperatures for an extruder performing the manufacturing method of the present invention. The four combinations of compositions and processing temperatures experimented are as below.

Example A

The first material 10 accounted for 20 wt %, and the second material 20 and compatibilizer 30 jointly accounted for 80 wt % in the mixture. Therein, PBS accounted for 100 wt % of the second material 20. The feed inlet temperature was 120° C. The maximum screw temperature was 160° C. The die temperature was 115° C.

Example B

The first material 10 accounted for 20 wt %, and the second material 20 and compatibilizer 30 jointly accounted for 80 wt % in the mixture. Therein, PBS accounted for 91 wt % and PLA accounted for 9 wt % in the second material 20. The feed inlet temperature was 130° C. The maximum screw temperature was 165° C. The die temperature was 120° C.

Example C

The first material 10 accounted for 60 wt %, while the second material 20 and the compatibilizer 30 jointly accounted for 40 wt % in the mixture. PBS accounted for 81 wt % and PLA accounted for 19 wt % in the second material 20. The feed inlet temperature was 140° C. The maximum screw temperature was 170° C. The die temperature was 125° C.

Example D

The first material 10 accounted for 80 wt %, while the second material 20 and the compatibilizer 30 jointly accounted for 20 wr % in the mixture. PBS accounted for 70 wt % and PLA accounted for 30 wt % in the second material 20. The feed inlet temperature was 150° C. The maximum screw temperature was 180° C. The die temperature was 135° C.

The properties of the net-shaped articles 105 made using the combinations of Example A through Example D were measured and listed in FIG. 5. By adjusting the proportions of components in the compositions and the processing temperatures, net-shaped articles 105 with various levels of hardness may be made to satisfy different applications.

Of course, the application of the net-shaped article 105 is not limited, and can be formed into any products selected from the group consisting of a bathing ball net, a drain strainer, a geogrid, etc.

Figure 6:
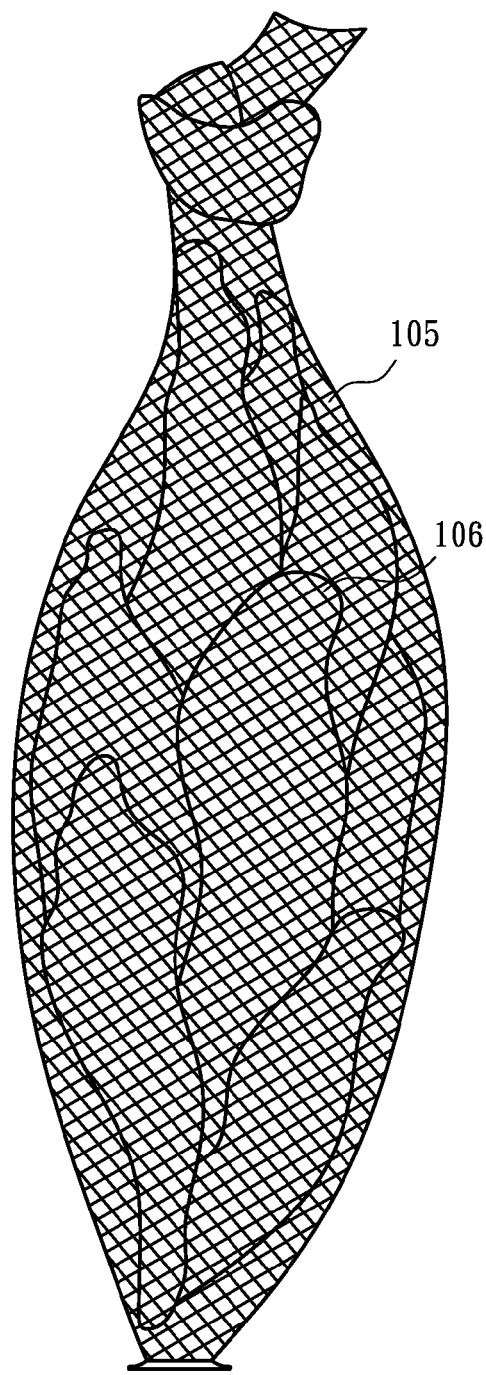
FIG. 6 is a schematic view of a net bag made using the present invention packaging agricultural goods.

As shown in FIG. 6, the net-shaped article has its one end sealed through, for example, a heat-stack process or any usable methods known in the art so as to become a net bag 105 for packaging an agricultural product 106. In addition to well accommodating articles, since the net bag 105 has the net structure that supports good ventilation, the agricultural products contains therein are unlikely to get rotten.

Figure 7:
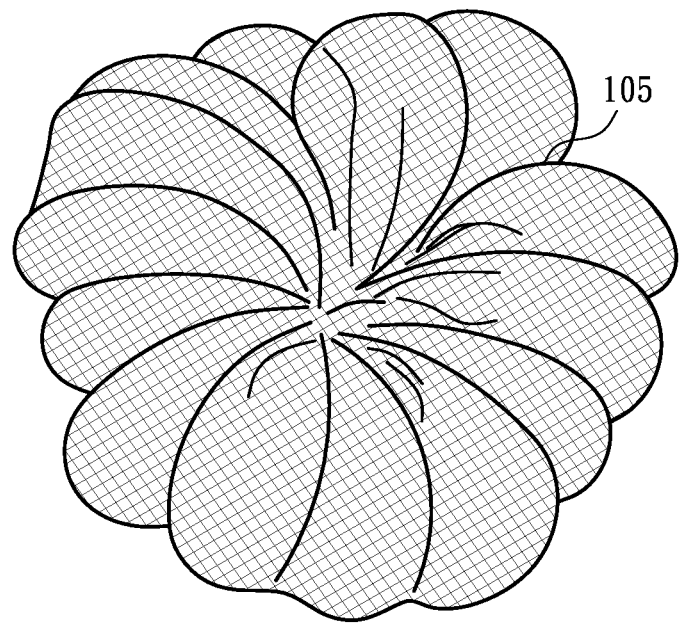
FIG. 7 is a schematic view of a bathing ball net made using the method of the present invention.

Referring to FIG. 7, a bathing ball net is made by knotting or otherwise shaping the net-shaped article. The net structure provides relatively large area for contacting with cleaning agents, so is more capable of producing and retaining lather under friction. Since the biodegradable bathing ball net includes PBS having a relatively high heat deflection temperature, it is unlikely to deform when it is brought into contact with shower water at a relatively high temperature.

Figure 8:
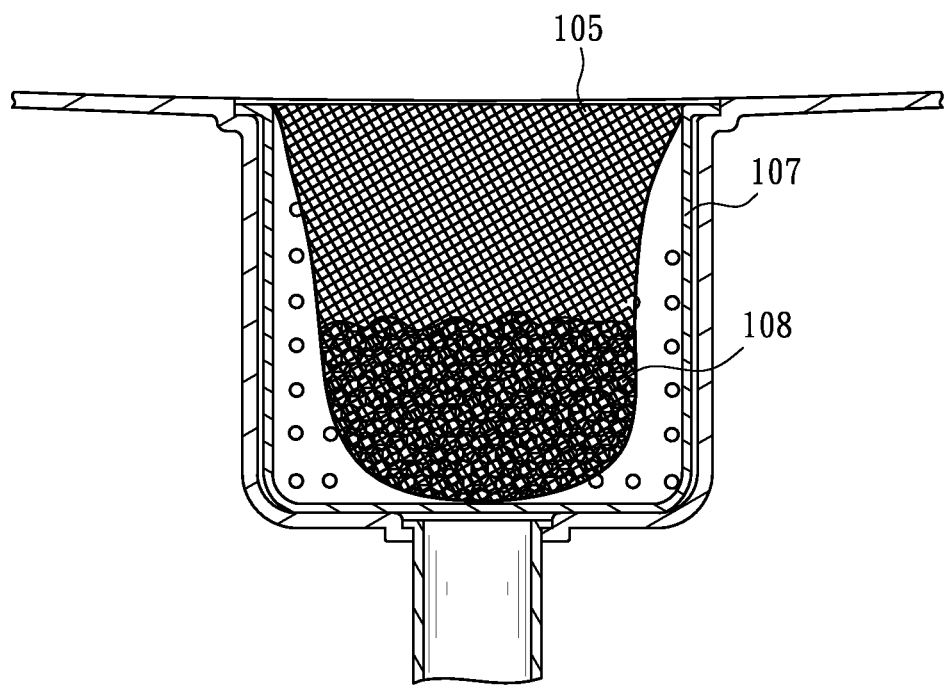
FIG. 8 is a schematic view of a drain strainer made using the method of the present invention.

Referring to FIG. 8, the net-shaped article may be configured as a drain strainer 105. In order to prevent a drain outlet from being clogged by food residue, the drain strainer 105 is disposed in a sink strainer 107 for catching food residue. When the drain strainer 105 is full of the food residue 108, the drain strainer 105 and the food residue 108 caught thereby may be removed from the sink strainer 107 together without the inconvenience of disposing the sink strainer 107 and the food residue 108 separately.

Besides, when the net bag 105 is configured as a geogrid, it may be used for reinforcing a slope land with poor vegetation to reduce soil erosion from a base of the land. After the vegetation of the slope land is formed completely and stably, the geogrid having biodegradability will degrade gradually in natural environment. Therefore, compared to a conventional geogrid, the geogrid made using the method of the present invention is environment-friendly and is convenient as it is not necessary to be removed from the slope land.

While the present invention has been described in connection with what are considered the most practical and preferred embodiments, it is understood that this invention is not limited to the disclosed embodiments but is intended to cover various arrangements included within the spirit and scope of the broadest interpretations and equivalent arrangements.

What is claimed is:

1. A manufacturing method of biodegradable net-shaped articles comprising steps of:
    (a) preparing a mixture having a melt flow index of between 3 and 8 by heating, stirring and thereby mixing a first material, a second material and a compatibilizer, with the first material being poly(butylenes adipate-co-terephthalate) (PBAT) in an amount of 20%-80% by weight based on a total weight of the mixture, and the second material as well as the compatibilizer making up the mixture to 100% of the total weight of the mixture, wherein the second material is a composition of polybutylene-1,4-succinate (PBS) and polylactic acid (PLA), in which PBS and PLA are in an amount of 70%-100% by weight and in an amount of 0%-30% by weight based on a total weight of the second material, respectively, and wherein the compatibilizer is in an amount of at least 0.05%-0.5% by weight based on the total weight of the mixture;
    (b) granulating the mixture into plastic grains;
    (c) baking the plastic grains in an oven at 60° C. to 70° C. for 3 to 4 hours;
    (d) melting and extruding the plastic grains by a screw-type extruder that has a rotary die unit so as to obtain a net-shaped preform, wherein in the extruder, a screw temperature is higher than a feed inlet temperature and a die temperature, while the die temperature is lower than the feed inlet temperature;
    (e) cooling and thereby finalizing the net-shaped preform in a cooling bath at a cooling temperature between 15° C. and 30° C., so as to obtain the net-shaped article.

2. The manufacturing method of claim 1, wherein the extruder has a processing temperature between 115° C. and 180° C.

3. The manufacturing method of claim 1, wherein the screw temperature is up to a temperature that is 30° C. to 40° C. higher than the feed inlet temperature.

4. The manufacturing method of claim 1, wherein the screw temperature is up to a temperature that is 40° C. higher than the die temperature.

5. The manufacturing method of claim 1, wherein the rotary die unit has a telescoped trunk and a rotating sleeve that is configured to rotate with respect to the telescoped trunk.

6. The manufacturing method of claim 1, wherein the screw temperature is increased when a weight percentage of PBS in the second material is decreased.

7. The manufacturing method of claim 1, wherein the extruder is a dual-screw extruder.

8. The manufacturing method of claim 1, wherein the net-shaped article is further processed into a bathing ball net.

9. The manufacturing method of claim 1, wherein the net-shaped article is further processed into a drain strainer.

10. The manufacturing method of claim 1, wherein the net-shaped article is further processed into a geogrid.

* * * * *